United States Patent
Liu

(10) Patent No.: US 9,901,114 B2
(45) Date of Patent: Feb. 27, 2018

(54) BATTERY ROD ASSEMBLY, ELECTRONIC CIGARETTE, AND ELECTRONIC CIGARETTE CHARGING APPARATUS

(71) Applicant: HUIZHOU KIMREE TECHNOLOGY CO., LTD. SHENZHEN BRANCH, Shenzhen, Guangdong (CN)

(72) Inventor: Qiuming Liu, Guangdong (CN)

(73) Assignee: HUIZHOU KIMREE TECHNOLOGY CO., LTD. SHENZHEN BRANCH, Shenzhen (CN)

( * ) Notice: Subject to any disclaimer, the term of this patent is extended or adjusted under 35 U.S.C. 154(b) by 64 days.

(21) Appl. No.: 15/024,856

(22) PCT Filed: Sep. 25, 2013

(86) PCT No.: PCT/CN2013/084188
§ 371 (c)(1),
(2) Date: Mar. 25, 2016

(87) PCT Pub. No.: WO2015/042799
PCT Pub. Date: Apr. 2, 2015

(65) Prior Publication Data
US 2016/0235119 A1    Aug. 18, 2016

(51) Int. Cl.
*A24F 47/00* (2006.01)
*H02J 7/00* (2006.01)
*H01M 10/04* (2006.01)

(52) U.S. Cl.
CPC .......... *A24F 47/002* (2013.01); *A24F 47/008* (2013.01); *H02J 7/0042* (2013.01); *H02J 7/0045* (2013.01); *H01M 10/0422* (2013.01); *H01M 10/0436* (2013.01); *H01M 2220/30* (2013.01)

(58) Field of Classification Search
CPC ...... A24F 47/00; A24F 47/002; A24F 47/008; H02J 7/0042; H02J 7/0045; H01M 10/0422; H01M 10/0436; H01M 2220/30
USPC ......................................................... 131/329
See application file for complete search history.

(56) References Cited

U.S. PATENT DOCUMENTS

| 2011/0303231 A1* | 12/2011 | Li | ........................ A24F 47/008 131/329 |
| 2012/0279512 A1* | 11/2012 | Hon | ...................... A24F 47/008 131/329 |

(Continued)

*Primary Examiner* — Harshad C Patel

(57) ABSTRACT

A battery rod assembly, an electronic cigarette, and an electronic cigarette charging apparatus are provided. In the electronic cigarette, on end of the battery rod assembly (1) is provided with an external electrode (12) and an internal electrode (11). A clamping groove (13) is disposed in an inner sidewall of the external electrode (12). A charging base (2) of the electronic cigarette charging apparatus comprises a first charging electrode (21) for being electrically connected to the internal electrode (11) and a second charging electrode (22) for being electrically connected to the external electrode (12). The second charging electrode (22) is provided with a buckling bending portion (221) protruding toward the direction away from the first charging electrode (21), and the position of the buckling bending portion (221) is corresponding to that of the clamping groove (13).

20 Claims, 7 Drawing Sheets

(56) References Cited

U.S. PATENT DOCUMENTS

| | | | | |
|---|---|---|---|---|
| 2013/0125906 A1* | 5/2013 | Hon | ................ | A24F 47/008 |
| | | | | 131/329 |
| 2013/0336358 A1* | 12/2013 | Liu | ................ | G01K 13/002 |
| | | | | 374/152 |
| 2014/0007891 A1* | 1/2014 | Liu | ................ | A24F 47/002 |
| | | | | 131/329 |

* cited by examiner

BATTERY ROD ASSEMBLY, ELECTRONIC CIGARETTE, AND ELECTRONIC CIGARETTE CHARGING APPARATUS

TECHNICAL FIELD

The present application relates to the technical field of daily electronic products, and more particularly, relates to a battery rod assembly, an electronic cigarette and an electronic cigarette charging apparatus.

BACKGROUND

Normally, an electronic cigarette is connected to an electronic cigarette charging apparatus by threaded connections during a charging process. As shown in FIGS. 1-3, a first charging electrode and a second charging electrode are placed on a charging base of the electronic cigarette charging apparatus while an internal electrode 100 and an external electrode 200 are provided on one end of a battery rod assembly. The first charging electrode is electrically connected to the internal electrode 100 and the second charging electrode is electrically connected to the external electrode 200 when the battery rod assembly is charged by the electronic cigarette charging apparatus. The first charging electrode, the second charging electrode, the internal electrode 100 and the external electrode 200 are designed as annular structures, therefore, the first charging electrode can be coaxially positioned in the second charging electrode while the internal electrode 100 can be coaxially positioned in the external electrode 200. As shown in FIG. 3, a screw which designed on an outer sidewall of the second charging electrode is corresponding to a screw on an inner sidewall of the external electrode 200. When the electronic cigarette is being charged by the charging apparatus, one threaded end of the charging base of the electronic cigarette charging apparatus is screwed into the battery rod assembly of the electronic cigarette along the screw on the inner sidewall of the external electrode 200 to achieve a electrical connection between the battery rod assembly and the electronic cigarette charging apparatus. However, this method of threaded connections tends to need a plurality of rotations to realize a firmly fixing which enables a steadily charging process. If the threaded end does not rotated to a designated position, an unstable charge can be caused by this loose connection while an excessive rotation may result in a damage of the electronic cigarette.

DISCLOSURE OF THE PRESENT APPLICATION

Technical Problems

The objective of the present application is to provide a battery rod assembly, an electronic cigarette and an electronic cigarette charging apparatus, which ensure a stable and effective charging process by a appropriate charging connection between the electronic cigarette charging apparatus and the electronic cigarette, aiming at the drawbacks in the prior art that, it is difficult to achieve a proper operation of the charging connection.

Solutions to Technical Problems

Technical Solutions

In accordance with one aspect of the present application, an electronic cigarette charging apparatus is provided, which is used for charging a battery rod assembly of an electronic cigarette; an external electrode and an internal electrode which are utilized to electrically connect to the electronic cigarette charging apparatus are disposed at an end of the battery rod assembly; wherein the electronic cigarette charging apparatus comprises a charging base, and the charging base includes a first charging electrode which corresponds to the internal electrode and a second charging electrode which corresponds to the external electrode; the second charging electrode is provided with a bucking bending portion protruding toward the direction away from the first charging electrode, and the position of the bucking bending portion corresponds to that of a clamping groove which is defined on an inner sidewall of the external electrode; when the battery rod assembly of the electronic cigarette is being charged, the bucking bending portion of the second charging electrode is buckled into the clamping groove.

In the electronic cigarette charging apparatus of the present application, two or more the second charging electrodes are provided; wherein at least two of the second charging electrodes are arranged symmetrically about the center of the charging base; during the charging process, the buckling bending portions of the second charging electrode which are arranged symmetrically about the center of the charging base are abutted against corresponding positions on the inner sidewall of external electrode respectively.

In the electronic cigarette charging apparatus of the present application, wherein the charging base includes an electrode support, and the first charging electrode and the second charging electrode are fixed on the electrode support, a first through hole is defined at the center of the electrode support, and the first charging electrode is inserted and fixed into the first through hole.

In the electronic cigarette charging apparatus of the present application, wherein a fixing groove symmetrically surrounding the first through hole is further defined on the electrode support; the second charging electrode is inserted and fixed in the fixing groove.

In the electronic cigarette charging apparatus of the present application, wherein the first charging electrode has a structure which is elastically and telescopically moves along an axial direction thereof.

In the electronic cigarette charging apparatus of the present application, wherein the electronic cigarette charging apparatus further comprises a charging apparatus main body; the charging base is fixed to one end of the charging apparatus main body by the electrode support.

In the electronic cigarette charging apparatus of the present application, wherein the first charging electrode includes an electrode body, a first charging projection and a first charging buckle; the first charging projection and the first charging buckle are formed by oppositely extending from two ends of the electrode body; and a diameter of the first charging projection and that of the first charging buckle are both larger than a diameter of the electrode body; the electrode body passes through the first through hole, the first charging projection and the first charging buckle are abutted against two ends of the first through hole respectively.

In the electronic cigarette charging apparatus of the present application, wherein an annular flange is provided on an end surface of the electrode support that is close to the second charging electrode and extends along a periphery of the first through hole; the annular flange extends from the end surface toward the direction away from the second charging electrode the first charging electrode includes an electrode body, a first charging projection and a first charging buckle; the first charging projection and the first charging buckle are formed by oppositely extending from two ends of the electrode body; and a diameter of the first charging projection and that of the first charging buckle are both larger than a diameter of the electrode body; the first through hole runs through the electrode support and a center of the flange; the electrode body passes through the first through hole while the first charging projection and the first charging buckle are abutted against two ends of the first through hole respectively.

In the electronic cigarette charging apparatus of the present application, wherein the second charging electrode further includes a connecting portion and a fixing portion which is used to fix the second charging electrode on the electrode support; the bucking bending portion is arranged on one end of the connecting portion that is away from the fixing portion, or arranged in the center of the connecting portion.

In the electronic cigarette charging apparatus of the present application, wherein the fixed bending portion is arranged at one end of the fixing portion that is away from the connecting portion.

In the electronic cigarette charging apparatus of the present application, wherein the second charging electrode comprises a strengthened bending portion which is placed between the fixing portion and the buckle bending portion.

In the electronic cigarette charging apparatus of the present application, wherein the electronic cigarette charging apparatus is a cigarette case of electronic cigarette.

In accordance with another aspect of the present application, a battery rod assembly is further provided, which is used to form an electronic cigarette with an atomization assembly; an external electrode and an internal electrode are located at one end of the battery rod assembly; the internal electrode corresponds to the first charging electrode of the electronic cigarette charging apparatus, while the external electrode corresponds to the second charging electrode of the electronic cigarette charging apparatus; wherein a clamping groove is defined on an inner sidewall of the external electrode, and a position of the clamping groove corresponds to that of a bucking bending portion on the second charging electrode; when the battery rod assembly is charged by the electronic cigarette charging apparatus, the bucking bending portion of the second charging electrode is buckled into the clamping groove.

In the battery rod assembly of the present application, wherein a clamping groove is a circle groove which is defined on the inner sidewall of the external electrode along the circumferential direction thereof.

In the battery rod assembly of the present application, wherein the clamping groove includes at least two buckling clamping recesses defined on the inner sidewall of the external electrode along the circumferential direction thereof; positions and shapes of the buckling clamping recesses correspond to those of the buckling bending portions on the second charging electrode.

In the battery rod assembly of the present application, wherein at least two of the buckling clamping recesses are arranged symmetrically about the center axial of the battery rod assembly.

In accordance with a further aspect of the present application, an electronic cigarette, comprising a battery rod assembly and an atomization assembly which is connected to the battery rod assembly; an external electrode and an internal electrode are located at one end of the battery rod assembly; the internal electrode corresponds to the first charging electrode of the electronic cigarette charging apparatus, while the external electrode corresponds to the second charging electrode of the electronic cigarette charging apparatus; wherein a clamping groove is defined on an inner sidewall of the external electrode, and a position of the clamping groove corresponds to that of a bucking bending portion on the second charging electrode; when the battery rod assembly is charged by the electronic cigarette charging apparatus, the bucking bending portion of the second charging electrode is buckled into the clamping groove.

In the electronic cigarette of the present application, wherein a clamping groove is a circle groove which is defined on the inner sidewall of the external electrode along the circumferential direction thereof.

In the electronic cigarette of the present application, wherein the clamping groove includes at least two buckling clamping recesses defined on the inner sidewall of the external electrode along the circumferential direction thereof; positions and shapes of the buckling clamping recesses correspond to those of the buckling bending portions on the second charging electrode.

In the electronic cigarette of the present application, wherein at least two of the buckling clamping recesses are arranged symmetrically about the center axial of the battery rod assembly.

Advantageous Effect

Technical Effect

With application of the battery rod assembly, the electronic cigarette and the electronic cigarette charging apparatus according to the present application, the following advantages can be achieved: by adding a second charging electrode which has a bucking bending portion on the charging base of the electronic cigarette charging apparatus and correspondingly arranging an external electrode which has a clamping groove on the battery rod assembly, it is possible to insert one end of the battery rod assembly to the corresponding end of electronic cigarette charging apparatus to ensure that the bucking bending portion of the second buckling electrode is buckled into the clamping groove on the external electrode when the electronic cigarette is being charged by the electronic cigarette charging apparatus. In this simple and effective way, a stable and proper connection between the electronic cigarette and the electronic cigarette charging apparatus can be achieved, avoiding an unstable charge caused by the insufficient rotation and reducing the risks of damage caused by an excessive rotation in the threaded connection structure.

BRIEF DESCRIPTION OF THE DRAWINGS

The embodiments of the present application or the technical solution will be further described with reference to the accompanying drawings and embodiments in the following. Obviously, the following accompanying drawings are only parts of the present application and it is possible for one skilled in the art to obtain other accompanying drawings according to these without paying any inventive work.

DETAILED DESCRIPTION OF THE PREFERRED EMBODIMENT

The technical solution of the embodiments of the present application will be clearly and completely described with reference to the accompanying drawings. Obviously, the following embodiments are only parts of the embodiments of the present application, not all the embodiments of the present application.

Figure 1:
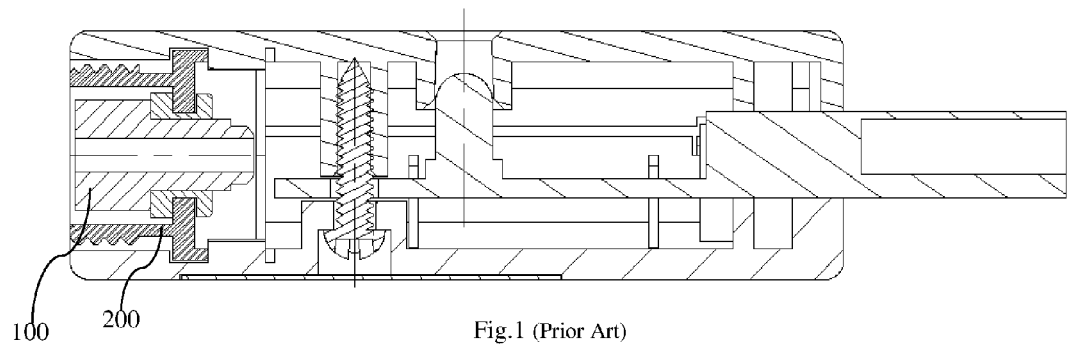
FIG. 1 is a cutaway view of an electronic cigarette charging apparatus provided in the prior art.
Figure 2:
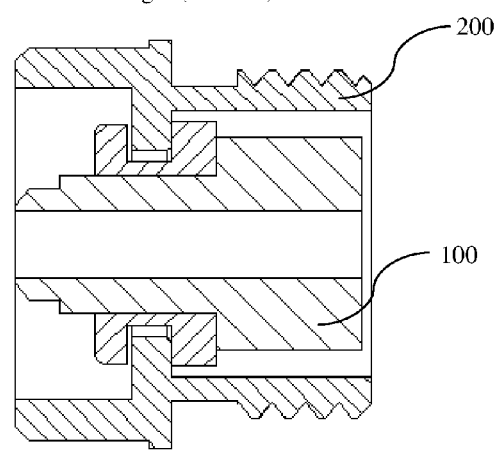
FIG. 2 is a cutaway view of a charging base of the electronic cigarette charging apparatus shown in FIG. 1.
Figure 3:
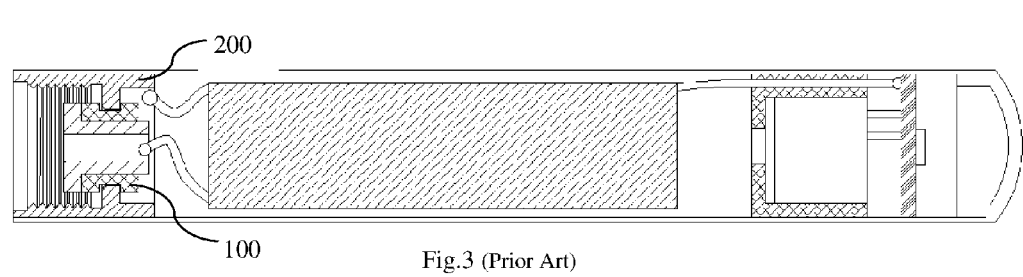
FIG. 3 is a cutaway view of a battery rod assembly provided in the prior art.
Figure 4:
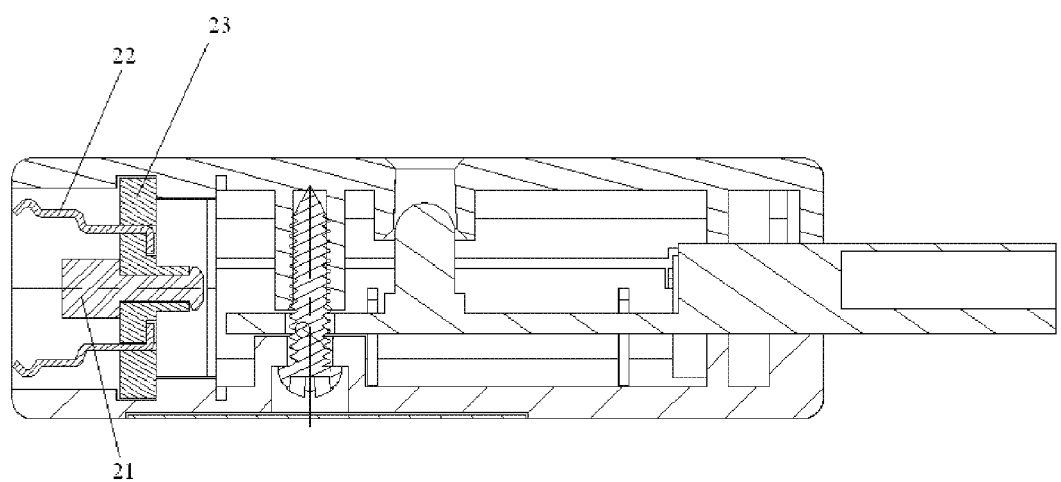
FIG. 4 is a cutaway view of the electronic cigarette charging apparatus provided in a preferred embodiment of the present application.
Figure 6:
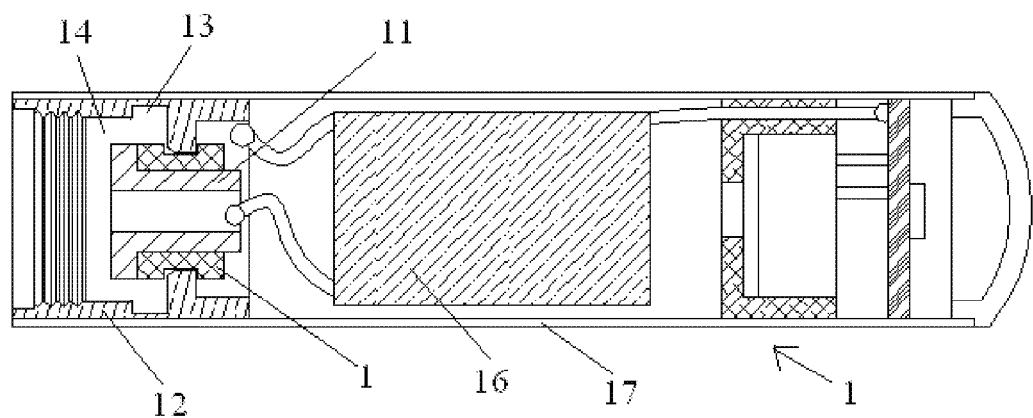
FIG. 6 is a cutaway view of the battery rod assembly provided in a preferred embodiment of the present application.
Figure 8:
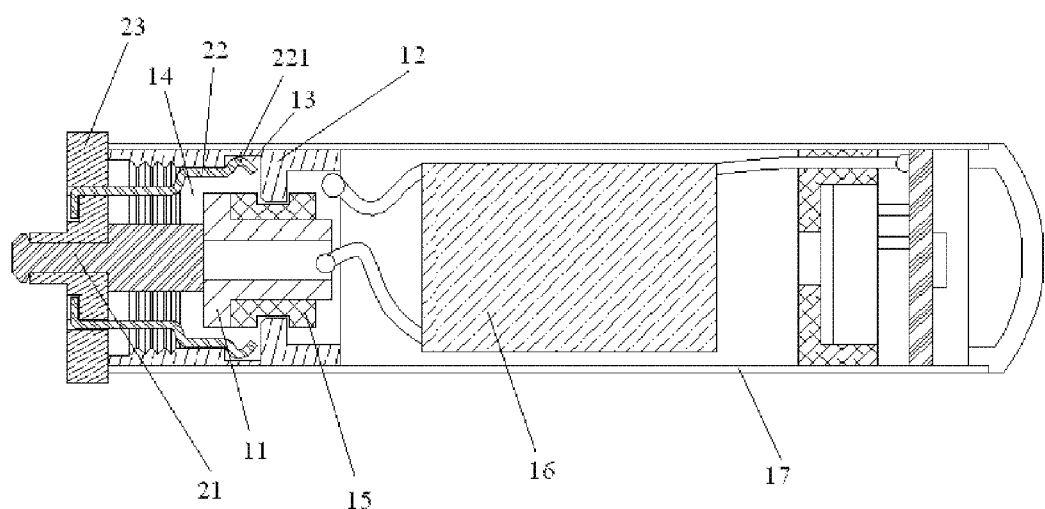
FIG. 8 is a cutaway view of the battery rod assembly in FIG. 6 and the charging base in FIG. 5 in which the battery rod assembly and the charging base are connected to each other.
Figure 9:
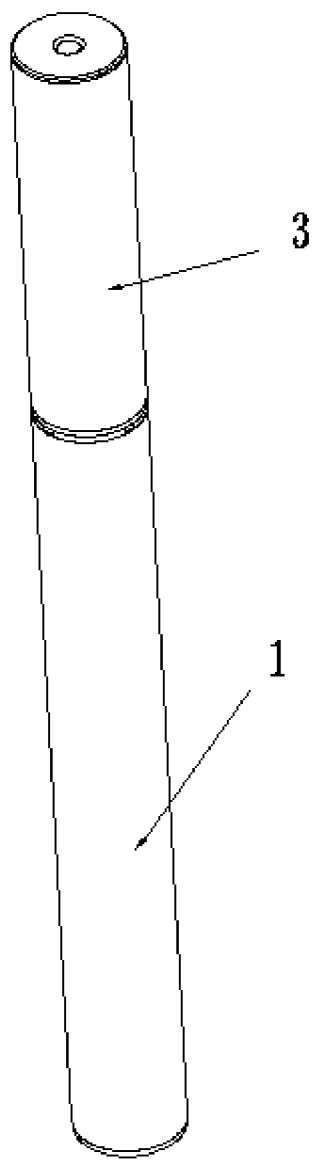
FIG. 9 is a schematic view of an electronic cigarette provided in the present application.

Referring to FIG. 8 and combining with FIG. 4, FIG. 6 and FIG. 9, a preferred embodiment of the present invention provides an electronic cigarette and a corresponding electronic cigarette charging apparatus.

In this case, the electronic cigarette comprises a battery rod assembly 1 and an atomization assembly 3 which is electrically connected to the battery rod assembly 1. An external electrode 12 and an internal electrode 11 are provided at one end of battery rod assembly 1 while a clamping groove 13 is defined on an inner sidewall of the external electrode 12. An electronic cigarette charging apparatus provides a charging base 2 which includes a first charging electrode 21 corresponding to the internal electrode 11 and a second charging electrode 22 corresponding to the external electrode 12. The second charging electrode 22 is provided with a buckling bending portion 221 protruding toward the direction away from the first charging electrode 21, and the position of the buckling bending portion 221 of the second charging electrode 22 is corresponding to that of the clamping groove 13 on the external electrode 12. When the battery rod assembly 1 of the electronic cigarette is charged by the electronic cigarette charging apparatus, the bucking bending portion 221 of the second charging electrode 22 is buckled into the clamping groove 13, in order to make a buckling connection between the battery rod assembly 1 and the charging base 2. Meanwhile, the second charging electrode 22 is supposed to fit tightly together with the inner sidewall of the external electrode, thus it can be electrically connected to the external electrode better. In addition, the first charging electrode 21 is abutted against the internal electrode 11 to realize an electrical connection between the first charging electrode 21 and the internal electrode 11.

Preferably, in order to make the charging connection between the electronic cigarette charging apparatus and the battery rod assembly more stable, it is possible to arrange a plurality of bending portions 221 on the second charging electrode 22 and correspondingly arrange a plurality of clamping grooves 13 on the inner sidewall of the external electrode 12 as well.

In the electronic cigarette and the electronic cigarette charging apparatus provided in the present application, by adding a second charging electrode which includes a bucking bending portion on the charging base of the electronic cigarette charging apparatus, and correspondingly adding an external electrode which includes a clamping groove on the battery rod assembly of the electronic cigarette, when charging the electronic cigarette by the electronic cigarette charging apparatus, the charging can be achieved only by inserting one end of the battery rod assembly to the corresponding end of the electronic cigarette charging apparatus to ensure that the bucking bending portion of the second charging electrode is buckled into the clamping groove of the clamping groove. In this simple and effective way, a stable and proper connection between the electronic cigarette and the electronic cigarette charging apparatus can be achieved, avoiding an unstable charge caused by the insufficient rotation and reducing the risks of damage caused by an excessive rotation in the threaded connection structure.

Figure 5:
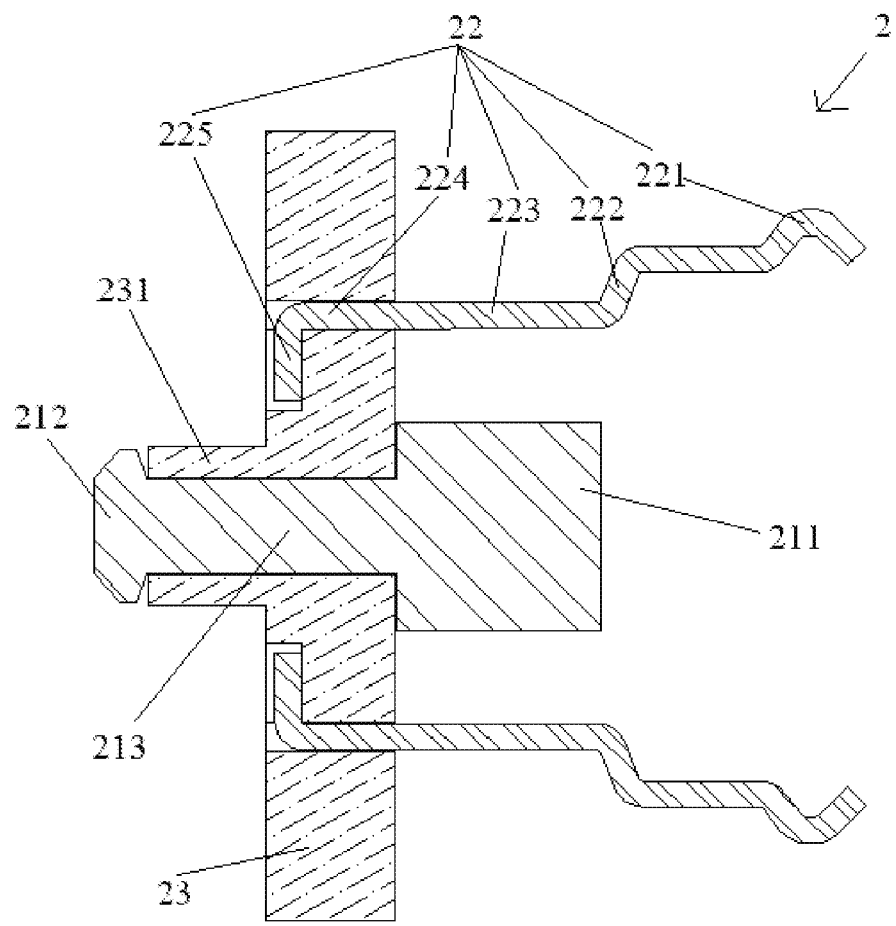
FIG. 5 is a cutaway view of the charging base of the electronic cigarette charging apparatus shown in FIG. 4.

As shown in FIGS. 4-5, the electronic cigarette charging apparatus includes a charging apparatus main body (not labeled in figures) and a charging base 2 fixed at one end of the charging apparatus main body. The charging base 2 comprises an electrode support 23 which is roughly in a disk shape. The first charging electrode 21 and the second charging electrode 22 are all fixed on electrode support 23 which can be in turn buckled in a clamping groove in the charging apparatus main body correspondingly. Therefore, the electrode support 23 is utilized to fix the first charging electrode 21 and the second charging electrode on the charging apparatus main body. It would be understood and appreciated by those skilled in the art that other connective structures can also be utilized to achieve fixing the first charging electrode 21 and the second charging electrode onto the charging apparatus main body.

In the first embodiment, a first through hole is defined on the electrode support 23, and the first charging electrode 21 is capable of being inserted and fixed in the first through hole. Preferably, the first through hole is located in the circle center of the electrode support 23. The first charging electrode 21 can be made from conductive materials such as flexible conductive rubber or silicone gel etc, or the first charging electrode 21 can be fixed on the electrode support 23 via elastic components so that it can elastically and telescopically move along an axial direction thereof. The first charging electrode 21 includes an electrode body 213, a first charging projection 211 and a first charging buckle 212. The first charging projection 211 and the first charging buckle 212 are formed by oppositely extending from two ends of the electrode body 213; and a diameter of the first charging projection 211 and that of the first charging buckle 212 are both larger than a diameter of the electrode body 213. The electrode body 213 passes through the first through hole while the first charging projection 211 and the first charging buckle 212 are abutted against two ends of the first through hole respectively. Wherein, the first charging projection 211 is columnar, and an end surface of the first charging projection 211 that is away from the electrode body 213 is used for contacting with the of the internal electrode 11 of the battery rod assembly of the electronic cigarette by surface contact, thus an electrical connection between the first charging electrode 21 and the internal electrode 11 is formed. In other embodiments, a resilient support block made from resilient material or a spring can be provided on the bottom of the first charging electrode 21 for enabling the first charging electrode 21 to elastically and telescopically move along an axial direction thereof.

Figure 7A:
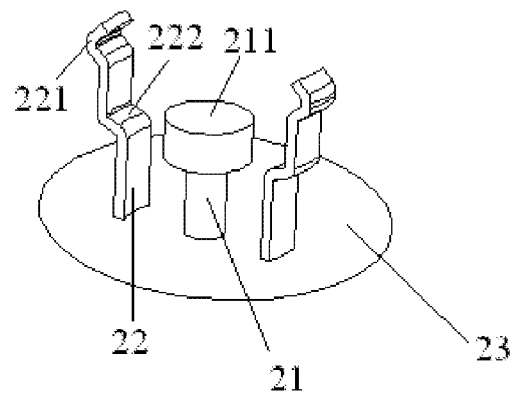
FIG. 7A is a schematic view of a charging base according to a first embodiment of the electronic cigarette charging apparatus provided in the present application.
Figure 7B:
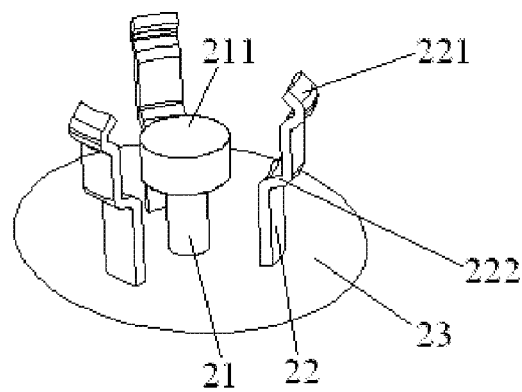
FIG. 7B is a schematic view of a charging base according to a second embodiment of the electronic cigarette charging apparatus provided in the present application.
Figure 7C:
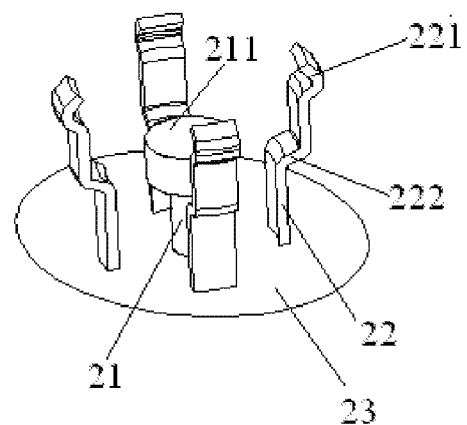
FIG. 7C is a schematic view of a charging base according to a third embodiment of the electronic cigarette charging apparatus provided in the present application.

Besides, a fixing groove is further defined on electrode support 23, and the second charging electrode 22 can be inserted and secured in this fixing groove. Preferably, the fixing groove is located around the circle center of the electrode support 23. The shape of the fixing groove is preferred to be adapted to the profile of one end of the second charging electrode 22 which is fixed into the fixing groove, such as, a fixing groove bent at an angle of 90° as shown in FIG. 5. Besides, in order to achieve a more stable connection between the electronic cigarette charging apparatus and the electronic cigarette, at least two fixing grooves are defined on the electrode support 23. Accordingly, the second charging electrode comprises at least two electroconductive elastic pieces whose quantity is equal to that of the fixing grooves. Furthermore, as shown in FIGS. 7A-7C, the fixing grooves and the electroconductive elastic pieces are supposed to be arranged symmetrically.

In the second embodiment, in order to ensure a more convenient electrical connection between the first charging electrode 21 and other circuit structures in the charging apparatus main body and simplify circuit layouts, an annular flange 231 is provided on an end surface of the electrode support 23 that is close to the charging apparatus main body and extends along a periphery of the first through hole. The annular flange 231 extends from the end surface towards the direction close to the charging apparatus main body. The first charging electrode 21 includes of an electrode body 213, a first charging projection 211 and a first charging buckle 212. The first charging projection 211 and the first charging buckle 212 are formed by oppositely extending from two ends of the electrode body 213; and a diameter of the first charging projection 211 and that of the first charging buckle 212 are both larger than a diameter of the electrode body 213. The first through hole runs through the electrode support 23 and annular flange 231, it is preferable that the first through hole runs through the centers of electrode support 23 and annular flange flange 231. Then the first charging electrode 21 is inserted and secured in the first through hole, specifically, the electrode body 213 passes through the first through hole while the first charging projection 211 and the first charging buckle 212 are abutted against the both ends of the first through hole respectively. Wherein, the first charging projection 211 is columnar, and an end surface of the first charging projection 211 that is away from the electrode body 213 is used for contacting with the internal electrode 11 of the battery rod assembly of the electronic cigarette by surface contact, thus an electrical connection between the first charging electrode 21 and the internal electrode 11 is formed. Besides, a fixing groove is further defined on electrode support 23, and the second charging electrode 22 can be inserted and secured in this fixing groove. Preferably, the fixing groove is located s around the circle center of the electrode support 23. The shape of the fixing groove is preferred to be adapted to the profile of one end of the second charging electrode 22 which is fixed into the fixing groove, such as, a fixing groove bent at an angle of 90° as shown in FIG. 5. Besides, in order to achieve a more stable connection between the electronic cigarette charging apparatus and the electronic cigarette, at least two fixing grooves surrounding the first through hole are defined on the electrode support 23. Accordingly, the second charging electrode comprises at least two electroconductive elastic pieces whose quantity is equal to that of the fixing grooves. Furthermore, as shown in FIG. 7A-7C, the fixing grooves and the electroconductive elastic pieces are supposed to be arranged symmetrically about the center of the charging base 2 or the electrode support 23.

In the third embodiment, the first charging electrode 21 is fixed on the electrode support 23 in any one mode above, while the second charging electrode 22 is fixed in the fixing groove of the electrode support 23. The second charging electrode 22 includes a buckling bending portion 221, a connecting portion 223 and a fixing portion 224 which is utilized to fix the second charging electrode 22 on the electrode support 23. The bucking bending portion 221 is arranged on one end of the connecting portion 223 that is away from the fixing portion 224, or arranged in the middle of the connecting portion 223. The fixing portion 224 is completely inserted and fixed in the fixing groove of the electrode support 23. Preferably, as shown in FIG. 5, the fixing portion 224 is also provided with a fixed bending portion 225 at one end away from the connection portion 223. The fixed bending portion 225 is arranged at an angle to the fixing portion 224, and the angle is an acute angle, a right angle or an obtuse angle; correspondingly, the fixing groove is bent at a corresponding angle, in order to ensure that the second charging electrode 22 can be firmly fixed in the fixing groove.

In the above embodiments, the first charging electrode 21 is buckled into the electrode support 23, while the second charging electrode 22 is inserted in the electrode support 23. However, the present invention is not limited to this kind of connection; in other embodiments of the invention, the first charging electrode 21 and the second charging electrode 22 can also be fixed on electrode support 23 by other connected modes well known to those skilled in the art such as bonding method, thread connecting method, interference fitting method etc. In addition, although the first charging electrode 21 is in "I" type structure in the above embodiments, it is possible for those skilled in the art to be understood that, in other embodiments of the invention, the first charging electrode 21 can also be column construction, T-shape structure or "L" type structure etc., as long as the abutting contact between the first charging electrode 21 and the internal electrode 11 is surface contact, thus the stability of the electronic cigarette charging apparatus during charging can be improved by increasing the contact area between the first charging electrode 21 and the internal electrode 11 in the electronics cigarette. It can be appreciated that, in other embodiments of the invention, it is also possible to arrange a plurality of first charging electrodes 21, and the positions of the first charging electrodes 21 are also not limited to the circle center of the electrode support 23, as long as the position of the first charging electrode 21 corresponds to the internal electrode 11 in the electronics cigarette.

The buckling bending portion 221 on each electroconductive elastic piece can be positioned identically or differently when the second charging electrode 22 comprises a plurality of electroconductive elastic pieces. For example, the buckling bending portions 221 on some electroconductive elastic pieces are positioned in the middle of the electroconductive elastic pieces, while some other buckling bending portions 221 are respectively located at one ends of the electroconductive elastic pieces that are away from the electrode supports 23. For other instances, the buckling bending portions 221 on each of the electroconductive elastic pieces are all positioned on one end of the electroconductive elastic pieces that is away from the electrode support 23.

In the fourth embodiment, the second charging electrode 22 further comprises a strengthened bending portion 222 which is located between the electrode support 23 and the buckling bending portion 221. Preferably, as shown in FIG. 5, the buckling bending portion 221 is arranged on one end of the connecting portion 23 that is away from the fixing portion 224, and the strengthened bending portion 222 is located between the fixing portion 224 and the buckling bending portion 221. The elasticity of the second charging electrode 22 can be strengthened by adding the strengthened bending portion 222, thus it is convenient to facilitate the buckling bending portion 221 on the second charging electrode 22 to buckle into the clamping groove 13 on the inner sidewall of the external electrode 12, meanwhile avoiding a damage of an electronic cigarette caused by an excessive hardness of the second charging electrode 22.

Figure 10:
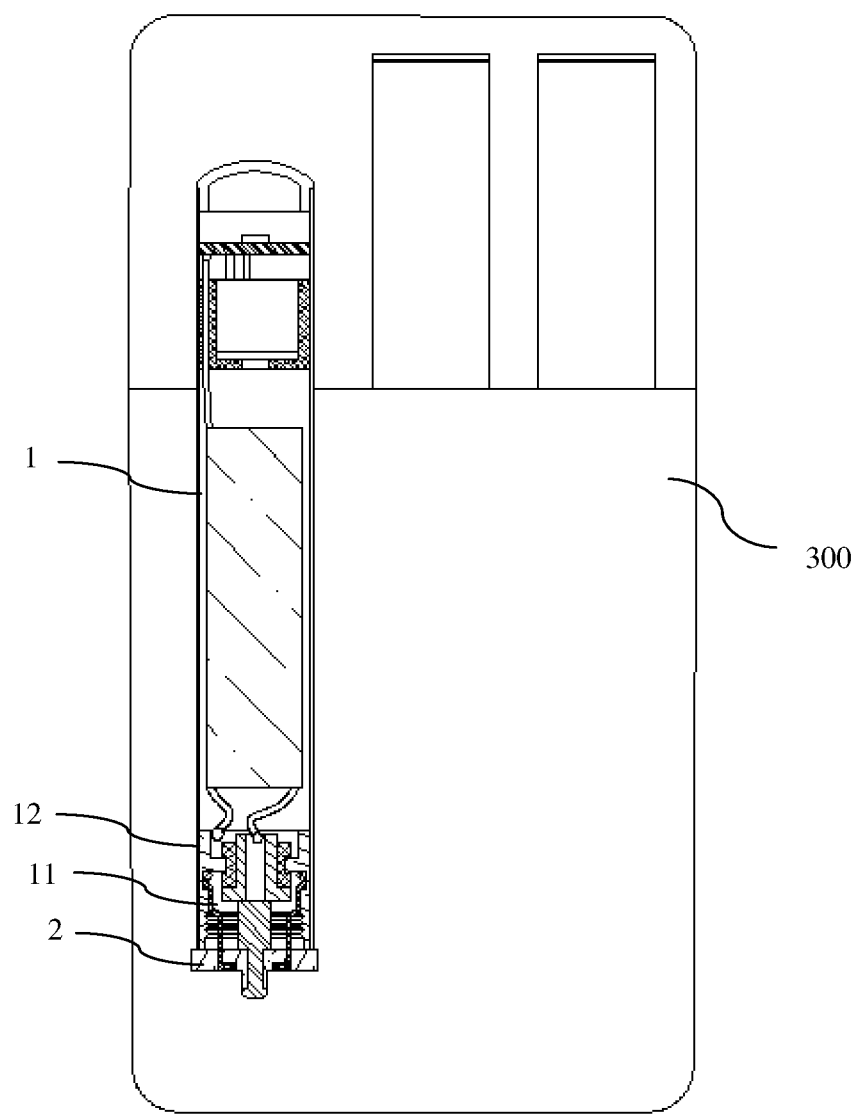
FIG. 10 is a schematic view of a cigarette case according to a preferred embodiment of the electronic cigarette provided in the present application.

As shown in FIG. 10, the electronic cigarette charging apparatus in any above embodiments can be an electronic cigarette case 300 where a charging base 2 is fixed. One end of the battery rod assembly 1 of the electronic cigarette having the external electrode 12 and the internal electrode 11 provided thereon are inserted in a correspondingly accommodating groove in the electronic cigarette case 300 during charging.

As shown in FIG. 6, a battery rod assembly 1 further comprises a battery 16 and a battery rod 17. The external electrode 11, the internal electrode 12 and the battery 16 are all sleeved in the battery rod 17. Other electronic components, such as a controller or the like, are provided in the battery rod 17. When electronics cigarette is working, the battery 16 supplies power to these electronic components in battery rod assembly 1 and the other electronic components in the electronic cigarette (such as an atomization assembly etc). The electronic components and the circuit formed by these electronic components are not repeated here as it belongs to the prior art. The external electrode 12 and the inner electrode 11 are roughly in the form of a ring, and the internal electrode 11 is coaxially arranged in external electrode 12. An accommodating cavity 14 for holding the first charging electrode 21 and the second charging electrode 22 is formed between the internal electrode 11 and the external electrode 12. The external electrode 12 and the internal electrode 11 are isolated from each other by placing an insulation part 15 between them. The internal electrode 11 is electrically connected to the negative or positive electrode of the battery 16 by electric wires while the external electrode 12 is electrically connected to the positive or negative electrode of the battery 16 by electric wires.

In one embodiment, the clamping groove 13 is the annular groove circumferentially defined on the inner sidewall of external electrode 12. This annular groove can limit the movement of the electronic cigarette charging apparatus on the axial direction of the electronic cigarette, but enable a rotation of the electronic cigarette charging apparatus around the axial of the electronic cigarette.

In the other embodiment, the clamping groove 13 includes at least two buckling clamping recesses defined on the inner sidewall of the external electrode 12 along the circumferential direction. Every two adjacent buckling clamping recesses are separated from each other at an equal or unequal distance. Preferably, in order to make the electronic cigarette charging apparatus is more stably connected to the electronic cigarette during a charging process, the buckling clamping recesses are arranged symmetrically about the central axis of the battery rod assembly 1 in the circumferential direction, for instance, corresponding to the electroconductive elastic pieces in FIG. 7A-7C. Furthermore, shapes of these buckling clamping recesses are supposed to be adapted to those of the buckling bending portions 221, to make the buckling bending portions 221 firmly buckled into the clamping grooves, and avoid the an up-down or left-right relative movement of the electronic cigarette charging apparatus with respect to the electronic cigarette during charging.

As shown in FIG. 8, when using the electronic cigarette charging apparatus to charge the electronic cigarette, the first charging electrode 21 and the second charging electrode 22 is inserted into the accommodating cavity 14 in the battery rod assembly 1, then the second charging electrode 22 is slid forward along the inner sidewall of the external electrode 12 until the buckling bending portion 221 moves into the clamping groove 13. After this, the buckling bending portion 221 is abutted against the inner sidewall of the external electrode 12 which forms the clamping groove 13. The surface between the buckling bending portion 221 and the strengthened bending portion 222 on the second charging electrode 22 fits tightly with the inner sidewall of the external charging electrode 12. What is more, the first charging electrode 21 is abutted against the internal electrode 11 while the electrode support 23 is abutted against one end of the battery rod 17 that is close to the external electrode 12. In this method, the electronic cigarette charging apparatus is sufficiently contacted with the electronics cigarette during the charging process. The charging circuit of the electronic cigarette charging apparatus of the present invention is not repeated here as it is a prior art.

Above disclosed embodiments which are only some preferable embodiments of the present invention can not be utilized to limit the claim scope of the present invention. It should be understood that, in the inspiration of the present application, those skilled in the art who appreciate and realize all or part of the process in above embodiments may make many modifications or alternatives, without going beyond the purpose and the scope the claims intend to protect of the present application. All these belong to the protection of the present application.

The invention claimed is:

1. An electronic cigarette charging apparatus, used for charging a battery rod assembly (1) of an electronic cigarette, an external electrode (12) and an internal electrode (11) which are utilized to electrically connect to the electronic cigarette charging apparatus are disposed at an end of the battery rod assembly (1); wherein the electronic cigarette charging apparatus comprises a charging base (2), and the charging base (2) includes a first charging electrode (21) which corresponds to the internal electrode (11) and a second charging electrode (22) which corresponds to the external electrode (12); the second charging electrode (22) is provided with a bucking bending portion (221) protruding toward the direction away from the first charging electrode (21), and the position of the bucking bending portion (221) corresponds to that of a clamping groove (13) which is defined on an inner sidewall of the external electrode (12); when the battery rod assembly (1) of the electronic cigarette is being charged, the bucking bending portion (221) of the second charging electrode (22) is buckled into the clamping groove (13).

2. The electronic cigarette charging apparatus according to claim 1, wherein two or more the second charging electrodes (22) are provided; wherein at least two of the second charging electrodes are arranged symmetrically about the center of the charging base (2); during the charging process, the buckling bending portions (221) of the second charging electrode (22) which are arranged symmetrically about the center of the charging base (2) are abutted against corresponding positions on the inner sidewall of external electrode (12) respectively.

3. The electronic cigarette charging apparatus according to claim 2, wherein the charging base (2) includes an electrode support (23), and the first charging electrode (21) and the second charging electrode (22) are fixed on the electrode support (23), a first through hole is defined at the center of the electrode support (23), and the first charging electrode (21) is inserted and fixed into the first through hole.

4. The electronic cigarette charging apparatus according to claim 3, wherein a fixing groove symmetrically surrounding the first through hole is further defined on the electrode support (23); the second charging electrode (22) is inserted and fixed in the fixing groove.

5. The electronic cigarette charging apparatus according to claim 1, wherein the first charging electrode (21) has a structure which may elastically and telescopically move along an axial direction thereof.

6. The electronic cigarette charging apparatus according to claim 3, wherein the electronic cigarette charging apparatus further comprises a charging apparatus main body; the charging base (2) is fixed to one end of the charging apparatus main body by the electrode support (23).

7. The electronic cigarette charging apparatus according to claim 3, wherein the first charging electrode (21) includes an electrode body (213), a first charging projection (211) and a first charging buckle (212); the first charging projection (211) and the first charging buckle (212) are formed by oppositely extending from two ends of the electrode body (213); and a diameter of the first charging projection (211) and that of the first charging buckle (212) are both larger than a diameter of the electrode body (213); the electrode body (213) passes through the first through hole, the first charging projection (211) and the first charging buckle (212) are abutted against two ends of the first through hole respectively.

8. The electronic cigarette charging apparatus according to claim 3, wherein an annular flange (231) is provided on an end surface of the electrode support (23) that is close to the second charging electrode (22) and extends along a periphery of the first through hole; the annular flange (231) extends from the end surface toward the direction away from the second charging electrode (22); the first charging electrode (21) includes an electrode body (213), a first charging projection (211) and a first charging buckle (212); the first charging projection (211) and the first charging buckle (212) are formed by oppositely extending from two ends of the electrode body (213); and a diameter of the first charging projection (211) and that of the first charging buckle (212) are both larger than a diameter of the electrode body (213); the first through hole runs through the electrode support (23) and a center of the flange (231); the electrode body (213) passes through the first through hole while the first charging projection (211) and the first charging buckle (212) are abutted against two ends of the first through hole respectively.

9. The electronic cigarette charging apparatus according to claim 2, wherein the second charging electrode (22) further includes a connecting portion (223) and a fixing portion (224) which is used to fix the second charging electrode (22) on the electrode support (23); the bucking bending portion (221) is arranged on one end of the connecting portion (223) that is away from the fixing portion (224), or arranged in the center of the connecting portion (223).

10. The electronic cigarette charging apparatus according to claim 9, wherein the fixed bending portion (225) is arranged at one end of the fixing portion (224) that is away from the connecting portion (223).

11. The electronic cigarette charging apparatus according to claim 9, wherein the second charging electrode (22) comprises a strengthened bending portion (222) which is placed between the fixing portion (224) and the buckle bending portion (221).

12. The electronic cigarette charging apparatus according to claim 1, wherein the electronic cigarette charging apparatus is a cigarette case of electronic cigarette.

13. A battery rod assembly, used to form an electronic cigarette with an atomization assembly; an external electrode (12) and an internal electrode (11) being located at one end of the battery rod assembly (1); the internal electrode (11) corresponding to a first charging electrode (21) of an electronic cigarette charging apparatus, while the external electrode (12) corresponding to a second charging electrode (22) of the electronic cigarette charging apparatus; wherein a clamping groove (13) is defined on an inner sidewall of the external electrode (12), and a position of the clamping groove (13) corresponds to that of a bucking bending portion (221) on the second charging electrode (22); when the battery rod assembly (1) is charged by the electronic cigarette charging apparatus, the bucking bending portion (221) of the second charging electrode (22) is buckled into the clamping groove (13).

14. The battery rod assembly according to claim 13, wherein the clamping groove (13) is a circle groove which is defined on an inner sidewall of the external electrode (12) along the circumferential direction thereof.

15. The battery rod assembly according to claim 13, wherein the clamping groove (13) includes at least two buckling clamping recesses defined on the inner sidewall of the external electrode (12) along the circumferential direction thereof; positions and shapes of the buckling clamping recesses correspond to those of the buckling bending portions (221) on the second charging electrode (22).

16. The battery rod assembly according to claim 15, wherein at least two of the buckling clamping recesses are arranged symmetrically about the central axial of the battery rod assembly.

17. An electronic cigarette, comprising a battery rod assembly (1) and an atomization assembly (3) which is connected to the battery rod assembly (1); an external electrode (12) and an internal electrode (11) being located at one end of the battery rod assembly (1); the internal electrode (11) corresponding to a first charging electrode (21) of an electronic cigarette charging apparatus, while the external electrode (12) corresponding to a second charging electrode (22) of the electronic cigarette charging apparatus; wherein a clamping groove (13) is defined on an inner sidewall of the external electrode (12), and a position of the clamping groove (13) corresponds to that of a bucking bending portion (221) on the second charging electrode (22); when the battery rod assembly (1) is charged by the electronic cigarette charging apparatus, the bucking bending portion (221) of the second charging electrode (22) is buckled into the clamping groove (13).

18. The electronic cigarette according to claim 17, wherein the clamping groove (13) is a circle groove which is defined on the inner sidewall of the external electrode (12) along the circumferential direction thereof.

19. The electronic cigarette according to claim 17, wherein the clamping groove (13) includes at least two buckling clamping recesses defined on the inner sidewall of the external electrode (12) along the circumferential direction thereof; positions and shapes of the buckling clamping recesses correspond to those of the buckling bending portions (221) on the second charging electrode (22).

20. The electronic cigarette according to claim 18, wherein at least two of the buckling clamping recesses are arranged symmetrically about the central axial of the battery rod assembly.

* * * * *